United States Patent [19]
Wiklund

[11] Patent Number: 5,686,995
[45] Date of Patent: Nov. 11, 1997

[54] SCALE PATTERN ARRANGEMENT

[75] Inventor: Rudolf Wiklund, Taby, Sweden

[73] Assignee: Dataliner AB, Sweden

[21] Appl. No.: 624,418

[22] PCT Filed: Sep. 28, 1994

[86] PCT No.: PCT/SE94/00893

§ 371 Date: May 22, 1996

§ 102(e) Date: May 22, 1996

[87] PCT Pub. No.: WO95/09344

PCT Pub. Date: Apr. 6, 1995

[30] Foreign Application Priority Data

Sep. 30, 1993 [SE] Sweden ............................ 9303191
May 10, 1994 [SE] Sweden ............................ 9401627

[51] Int. Cl.$^6$ ............................................. G01C 5/00
[52] U.S. Cl. ............................ 356/398; 356/375; 33/288
[58] Field of Search ............................ 356/375, 376, 356/398, 394, 400, 243; 33/288, 293; 72/705

[56] References Cited

U.S. PATENT DOCUMENTS 4,492,471  1/1985  Wiklund .................... 356/375
4,997,283  3/1991  Danielson et al. .......... 356/400
5,251,013 10/1993  Danielson et al. .......... 356/375

FOREIGN PATENT DOCUMENTS

WO92/09863  6/1992  WIPO.

*Primary Examiner*—Hoa Q. Pham
*Attorney, Agent, or Firm*—Larson and Taylor

[57] ABSTRACT

A scale pattern is placed in close proximity of a measuring point whose position is to be determined in at least one dimension with the aid of a narrow measuring beam which moves in one place and sweeps over the scale pattern as it moves. The scale pattern is such that an indicating arrangement which indicates impingement of the measuring beam on the scale pattern gives rise to different signal patterns from a beam detector (25) for different heights at which the measuring beam sweeps over the scale pattern. The scale pattern has reflective and non-reflective pattern parts. Each scale pattern includes part-patterns (63, 64; 84, 85; 90, 91; 102, 105) which are operative in providing time or position scale-calibration for the signal pattern obtained from the beam detector (25) as the measuring beam sweeps over the scale pattern.

9 Claims, 5 Drawing Sheets

SCALE PATTERN ARRANGEMENT

FIELD OF THE INVENTION

The present invention relates to a scale pattern arrangement of the kind having a position pattern and a calibration pattern which provides a time or length scale calibration.

BACKGROUND OF THE INVENTION

The measurements of a vehicle chassis are typically determined by means of methods in which a measuring unit, which is moveable along a measuring rail, is caused to direct a laser measuring beam onto measuring points specified on the vehicle chassis. The position of the unit along a vertical scale on the measuring rail is read-off against each chassis measuring point. This measurement value is fed into a memory and is subsequently processed in a computer, for instance a personal computer or a minicomputer having sufficient data processing capacity to make the calculations required. The measurement values are computer processed And presented as absolute values together with an indication of the extent to which these absolute values deviate from corresponding values obtained when measuring against a standard vehicle of the actual model concerned. Consequently, data related to different makes or models of cars are available for loading into the data system used or have already been stored in the fixed memories associated with the computer system.

U.S. Pat. No. 5,251,013 teaches a scale arrangement in which individually coded scales are positioned at different measuring points, such that each of the scales can be recognized or identified through its particular code. The patent specification also teaches scales which are so configured as to enable deviations in a height or vertical direction to be ascertained, although these scales are of a simple kind and are unable to provide a fine resolution of the height position. The scales taught by this prior patent specification are adapted for a measuring system which operates with a rotary measuring beam which rotates in one direction only.

SUMMARY OF THE INVENTION

The main object of the present invention is to provide a measurement scale which will provide a clear indication that a measurement signal actually derives from a sweep of the measuring beam over a measurement scale.

Another object of the invention is to provide a measurement scale which will enable measurements to be taken automatically in three dimensions with good resolution.

A further object of the invention is to provide a measurement scale which can be placed at different measuring points on a large object to be measured, for instance a car chassis, and which is not adapted individually to the measuring point on which it is attached.

Still another object of the invention is to provide a measurement scale which will provide a high degree of resolution of the height position measured or determined.

Yet another object of the invention is to provide a measurement scale which will indicate that it is partially obstructed, by the configuration of an obtained measuring beam in time. In this regard, the measuring arrangement can be readjusted to determine the measuring point on which the obstructed scale is located, therewith providing good penetration to different measuring points when measuring is effected from a measuring rail for instance, i.e. it shall be possible to reach all measuring points with a measuring beam transmitted from the rail.

At least the main object of the invention is achieved with a measurement scale having the characteristic features set forth hereafter. Further features and further developments of the invention are also set forth hereafter.

BRIEF DESCRIPTION OF THE DRAWINGS

The invention will now be described in more detail with reference to the accompanying drawings, in which.

DESCRIPTION OF THE PREFERRED EMBODIMENTS

Figure 1:
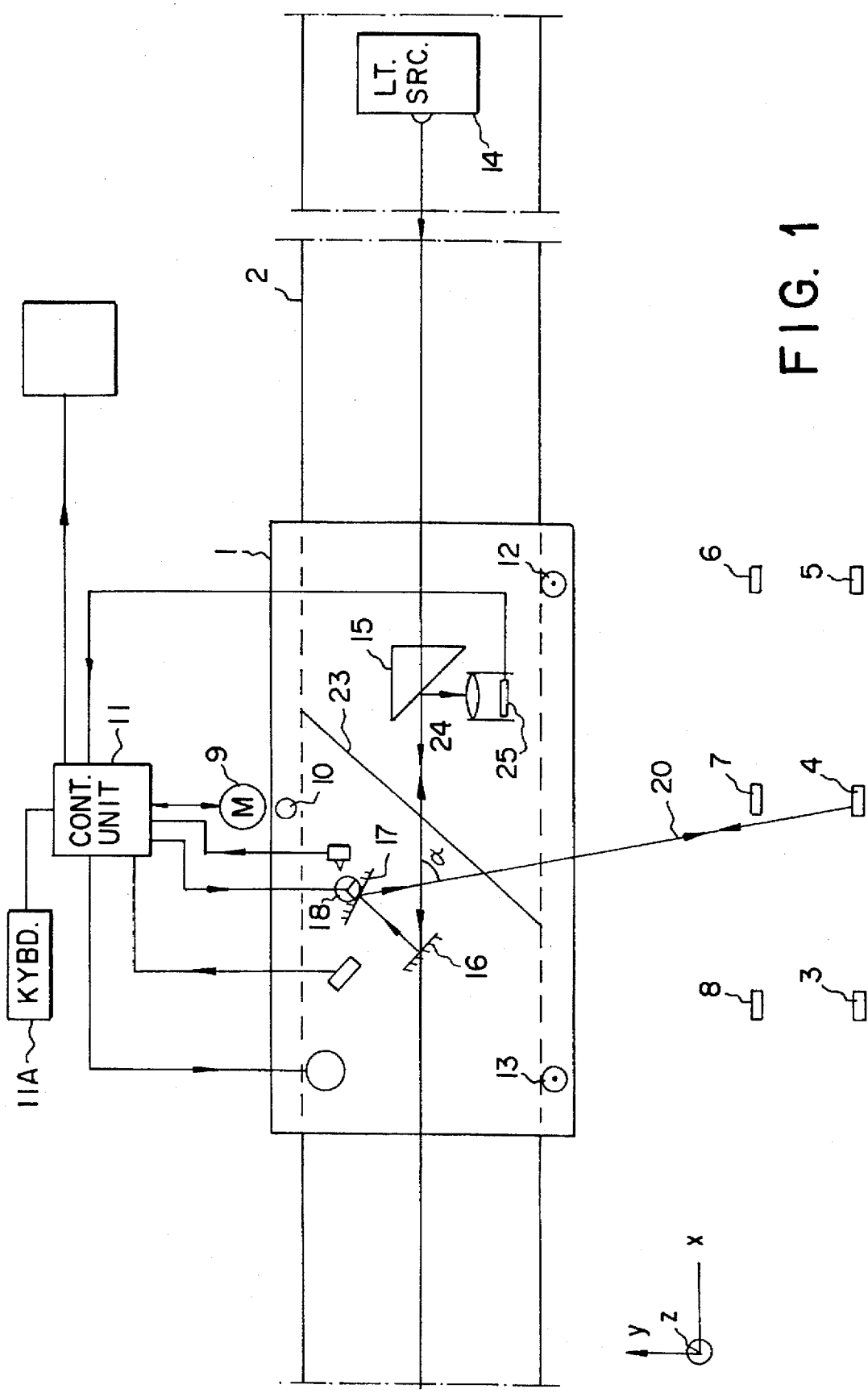
FIG. 1 illustrates a measuring system including a carriage which moves along a measuring rail, and measurement scales against which measuring is effected.

FIG. 1 illustrates a carriage 1 which is movable along a measuring rail 2 which functions as a measuring path. The measuring rail, is intended to be placed adjacent an object (not shown) to be measured, for instance a car. The object to be measured has mounted thereon measuring devices 3–8 which are provided with inventive measurement scales by means of which impingement of a light beam, preferably a laser beam, on a measuring point can be indicated automatically. The measuring devices are provided with scale patterns which include reflective and non-reflective parts, and which preferably have the form of rules which hang from appropriate measuring points on the object to be measured. The latter particularly applies when the object to be measured is a car chassis. The scale patterns may also have the form of stick-on strips or sheets that are adhered to the object to be measured.

The carriage 1 is driven in one or the other direction (in the X direction) by a motor 9, which drives a rubber wheel 10 between the measuring rail 2 and the carriage 1 and which is controlled by a control unit 11. Mounted between the rail and the carriage, on the side thereof opposite to the side on which the wheel 10 is mounted, is a pair of freely-rotating wheels 12, 13 which support and fix the carriage transversely to the rail and also vertically, i.e. in the Y direction and the Z direction.

The control unit 11 is preferably a computer, for instance a microcomputer of conventional kind into which appropriate software has been loaded. The control unit is operated by an operator through the medium of a keyboard 11A or the like.

A light source 14 having a narrow beam path, preferably a laser, is placed on one end of the rail 2 and directed so that the beam path from the light source 14 will move along the rail. The beam path moves transversely through a right-angled prism 15 having one side surface extending transversely to the beam path from the beam source in the direction of incidence.

The beam path then impinges on one mirror 16 in a pentagon-type mirror arrangement. The mirror 16 is fixedly mounted on the carriage 1. The mirror 16 deflects the beam onto another mirror 17 in the mirror arrangement. The mirror 17 can be turned to different rotary positions with the aid of a setting device 18 controlled by the control device 11.

In this regard, during a measuring period of the measuring sequence an outgoing beam 20 will be directed at a fixed, but selectable angle α that has been chosen between the incoming laser beam and the outgoing beam 20. The angle α may have any desired value and may be an obtuse angle or an acute angle.

When a plurality of measuring points are chosen, it is possible that these measuring points or the indicating arrangement in the proximity thereof, such as the measuring rules described below, will be obstructed at some selected angles. A high degree of penetration is obtained for measuring all selected measuring points, because many different angular positions can be chosen. The measurement scales will preferably have patterns which will give an automatic indication as to whether or not a measurement scale is obstructed, as described in more detail further on.

The outgoing measuring beam 20 impinges on the inventive measurement-scale carrying rules or stick-on sheets 3-8 as the carriage 1 is moved backwards and forwards along the measuring rail.

When the light beam impinges on a reflective part, light is reflected in the opposite direction to the beam 20, through the pentagon mirror arrangement 16, 17. An aperture diaphragm 23, which may be placed in the beam path between the mirrors 16 and 17 for instance, blocks out all rays of light that are reflected in other directions. The reflected light beam is then deflected by the hypotenuse side of the right-angled prism 15 onto an optic 24, shown schematically as a lens in FIG. 1, which collects the reflected light on a beam-radiation detector, such as a light detector 25.

The pentagon mirror arrangement consequently deflects reflected light so as to obtain an indication in an immediately opposite direction to the direction of the transmitted light, irrespective of rotation of the carriage, i.e. the light passes along the same optical axis both towards and away from the rules or the adhesive sheets 3-8.

FIGS. 2-5 illustrates different embodiments of inventive scale patterns mounted on rules that are hung from measuring points on the object to be measured. The scale patterns are configured so as to enable the height at which a measuring beam impinges on a rule to be established with the aid of the configuration of the signal received from the detector 25 as the carriage 1 is moved along the rail 2 during a measuring cycle and therewith also along the object to be measured.

The inventive scale pattern can also be used in other areas than those which coact with the aforedescribed measuring sweep. For instance, they can be used in cooperation with a measuring arrangement which transmits a rotating measuring beam. Such measuring arrangements are often placed stationarily at or adjacent the object to be measured.

Each scale pattern of these embodiments has a reflective background with applied parts of non-reflective material, for instance in the form of dull-black pigment or adhered dull-black strips. However, it also lies within the scope of the invention for the reverse conditions to apply between reflective and non-reflective surfaces, even though this will provide a somewhat less reliable result than the result obtained with the illustrated embodiments.

A non-reflective part which has a longer extension in the direction in which the measuring beam passes over the scale pattern than any one of the inner non-reflective parts applied to the rule is provided along at least one side edge, preferably along both side edges of the scale pattern. Because the side-parts are relatively wide, for instance having a width of 5 mm as opposed to a width of 2 mm in the case of the inner non-reflective paths, it is easy for the calculating unit 11 to distinguish between edge-parts and measuring-parts in a scale pattern. Furthermore, it is easy to detect whether or not a scale pattern is partially hidden and whether or not measuring needs to be carried out at another angle $\alpha$ in relation to the rail 2.

When the measuring beam moves freely in space as the carriage 1 moves along the rail 2 without impinging on a rule, reflections will be obtained from the surroundings, causing the light rays detected by the detector 25 as the carriage moves along the beam to be relatively varied. By including a fully black part at the beginning of a sweep over a scale pattern, there will be obtained a sub-signal which is close to zero for a given period of time, therewith indicating that a measuring beam has begun to sweep over a scale pattern and that measuring of a new scale pattern has begun. This indication is also needed should a rule provided with a scale pattern be partially obstructed by some other rule or by some other object.

The non-reflective edge-parts are made broader than the remaining non-reflective parts simply to enable these edge-parts to be distinguished from the remainder by virtue of the pulse lengths of the detector signal obtained.

The rule scale pattern is preferably made symmetrical around the center line of the rule. This will provide particularly clear information as to whether the scale pattern is obstructed or not. A pulse pattern which is received from the detector 25 and which does not consist of two mutually mirror-image pulse-pattern halves will indicate that the scale pattern is partially obstructed and should not be used to determine the position of a rule or like measuring device. FIGS. 2 to 5 illustrate two embodiments of symmetrical scale patterns.

The calculating unit may be constructed to check the signal pattern that is obtained from the indicating arrangement as a measuring beam sweeps across the scale pattern, with stored data relating to an anticipated or expected signal configuration or signal pattern and to accept only signal patterns which fulfil the stored data. This provides still greater insurance that a calculation is carried out on a signal pattern obtained with a sweep across a measurement scale and not on a signal pattern deriving from different ambient reflections.

The pulse widths obtained are fully correlated with the distances travelled by the carriage 1 along the rail 2. The width, or breadth, of the non-reflective side-edges are fully known and determined, for instance 5 mm. This enables a non-straight rule to be detected, i.e. a rule which does not extend parallel with the rail, so that a scale correction can be made in respect of this rule. Because the width of either the side-edge or the scale pattern is known, the detected height can be corrected, because the measured width divided by the measured height is equal to the known width divided by the correct height.

Figures 2, 5:
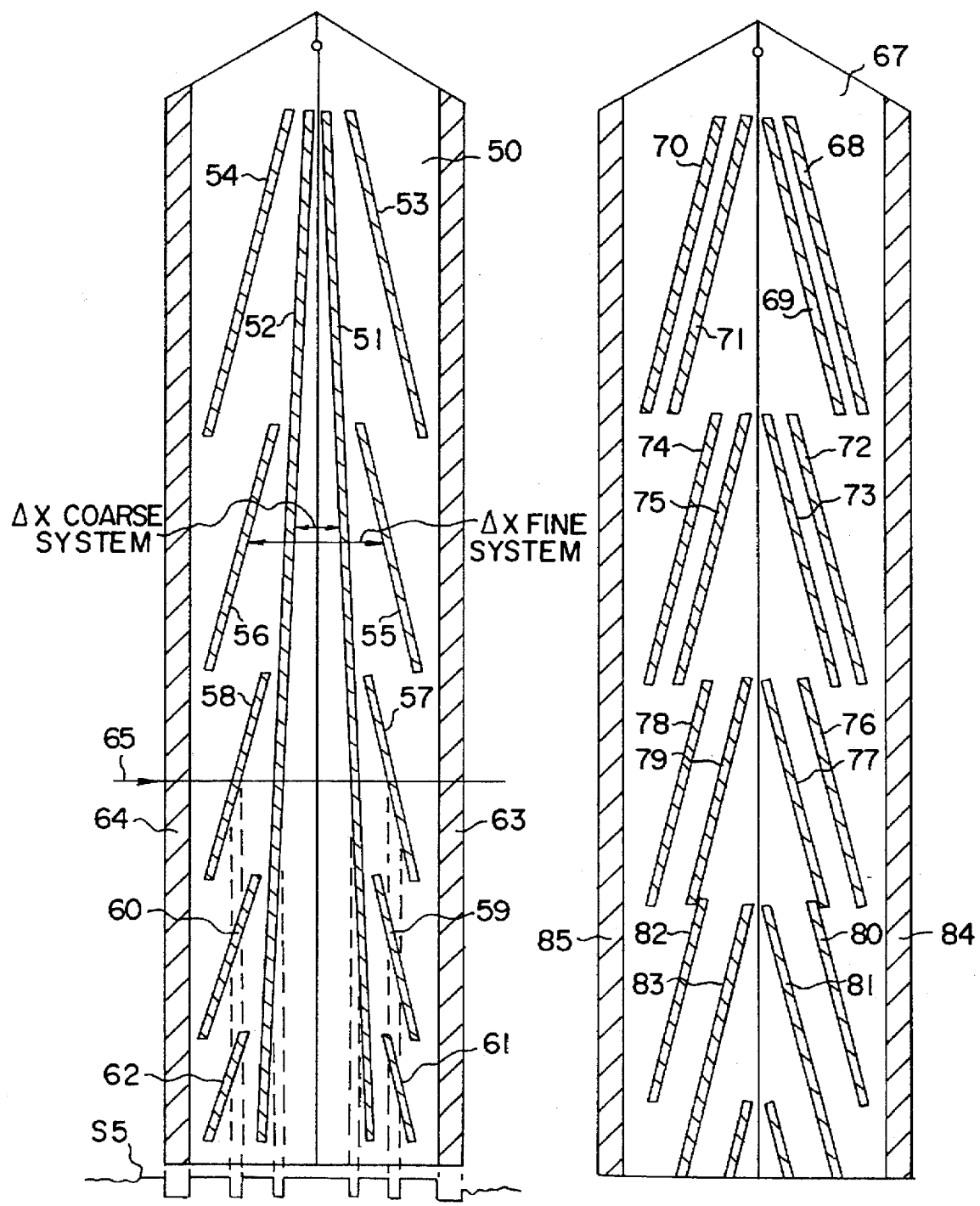
FIGS. 2–9 illustrate different exemplifying embodiments of an inventive measurement scale placed on a measuring point.

FIG. 2 illustrates a special embodiment of non-reflective parts of a rule 50 having a reflective background so as to provide both a rough height estimation and a fine height estimation within a number of rule sections. Two non-reflective strips 51 and 52 are placed obliquely and in mirror image in relation to one another relative to a center line. The strips 51 and 52 extend over practically the whole length of the rule 50 and form a rough estimation system.

In order to enable a finer sub-division to be obtained than is possible with the strips 51 and 52, which have a relatively small slope in relation to the center line of the rule 50, the scale pattern on the rule is divided into a number of sections along its length, where each section includes two obliquely positioned non-reflective strips 53, 54; 55, 56; 57, 58; 59, 60; 61, 62 which have a much greater slope to the center line than the strips 51, 52. Each non-reflective broad strip 63 and 64 is mounted on a respective edge of the scale pattern.

The signal s, which is obtained when the beam 65 moves over the rule 50, will in this case have a pulse sequence of six negative pulses, which begin with a broad start pulse and terminate with a broad stop pulse. There are obtained in the center of the pulse sequence two pulses having a pulse interspace which is different for different heights, which provides the rough estimation of the height position. These pulses also determine in particular the relevant section of the rule. The pulse interspace between both of said pulses externally thereof clearly denotes a finer calibration of the height position of the beam 65 on the rule within the section indicated by the pulse interspace between the centermost pulses.

The distance between start and stop pulse from the broader edge-strips 63 and 64 provides an indication of the time scale of the pulse train S5. The time scale is fully correlated with the length scale on the rail. Even though the carriage 1 (FIG. 1) is moved along the object to be measured at a speed which is determined for each time unit, one or more of the rules may be positioned more or less obliquely, i.e. angled in relation to the measuring rail 2. The start and stop pulses provide an indication irrespective of this. The space in which measuring is effected is often draughty or windy and it is possible that the rules will be caused to swing during the measuring operation. Neither does the carriage 1 always move at a uniform speed. Consequently, a time or position calibration should always be carried out.

In this case, the calculating unit 11 calculates the height position while taking into account the time scale concerned, correlated with the length scale of the rail obtained with the start and the stop pulses, i.e. a scale calibration is made for each pulse sequence received as a result of impingement of the measuring beam on a rule as the carriage is moved along the rail, before the actual height calculation is made on the basis of the different pulse interspaces in the signal sequence received. This property may, of course, also be applied with the majority of the described measuring rules.

It will be obvious that a sector may be subdivided in more than two steps. For instance, in respect of the rough estimation, each section may, in turn, be divided into intermediate sections of which each is, in turn, finely subdivided. This results in the addition of further strips in the scale pattern, these strips extending within each intermediate section of the rough estimation section obliquely in relation to the rule center line with a still greater slope than that shown in FIG. 2 with regard to the strips within each sub-section.

Figure 3:
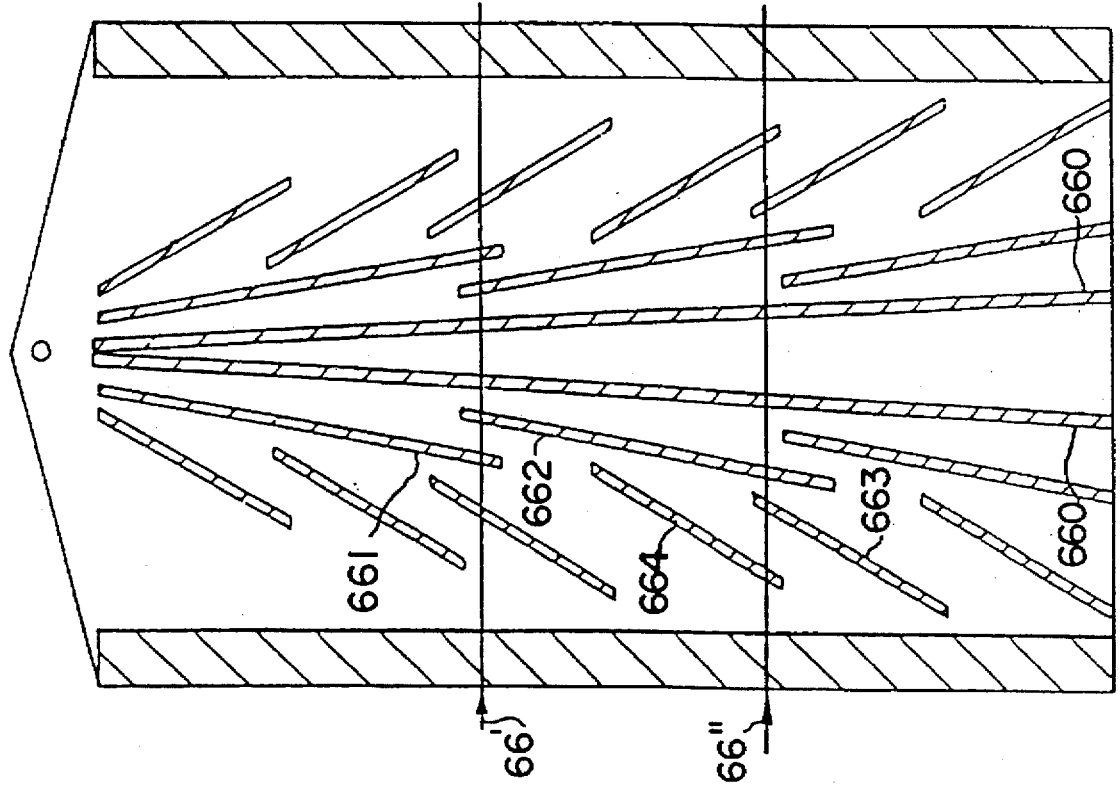

FIG. 3 illustrates an embodiment which includes three different rough estimation divisions. It will be noted that there is a certain overlap between the strips in the various sections, such that a measuring beam will pass over two strips at a section shift for each rough estimation division. For instance, the measuring beam 66' passes over two non-reflective strips 661 and 662 with a symmetric overlap on both sides of the rule center line in the next-finest rough estimation division. The measuring beam 66" thus moves over two non-reflective strips 663 and 664 with an overlap in the next-finest rough estimation division. The pattern strips 660 in the roughest of the rough estimation divisions extend at an angle to the center line continuously from top to bottom of the rule.

Figure 4:
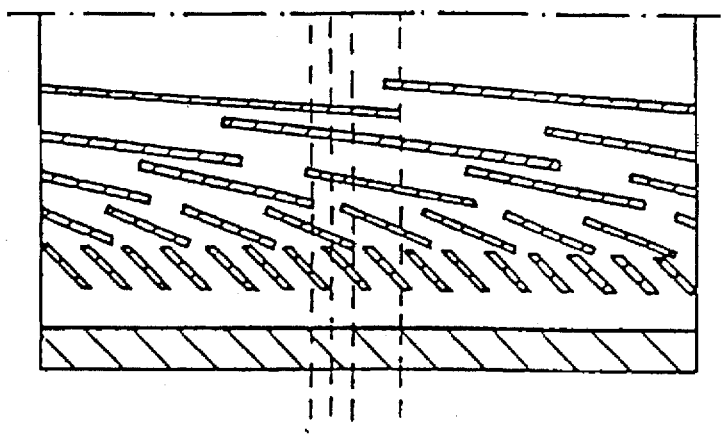

FIG. 4 illustrates part of a scale pattern which includes five fine/rough estimation systems. In this embodiment, the innermost system of strips constituting the roughest of the rough estimation divisions is divided into sections in order to save room on the rule. The measuring beam moves on each side of the center line over five or six strips, depending on the height at which the beam impinges on the rule. The overlap positions of the different rough estimation systems are arranged in this way in relation to one another, i.e. the rough/fine systems shall never have a transition from one section to another (shift phase) simultaneously. The jump of different phases in the different rough estimation divisions is similar to a Gray code in a code disc. Naturally, the rough estimation divisions may be greater in number than that illustrated. It should be possible to achieve a principly better solution until about 50% of the surface of the rule has been covered with non-reflective pattern parts, apart from the broad side-strips.

FIG. 5 illustrates another special embodiment of non-reflecting parts on a rule 67 having a reflecting background such as to provide a rough height estimation and a fine height estimation within a number of sections on the rule 67. This embodiment includes within each section two mutually parallel, obliquely positioned non-reflecting strips 68, 69; 70, 71 and 72, 73; 74, 75 and 76, 77; 78, 79 and 80, 81; 82, 83 on each side of the center line of the rule 67. A non-reflecting strip 84 and 85 is provided on a respective edge of the rule 67. As in the case of the FIG. 2 embodiment, the signal (not shown) obtained as the beam path moves over the scale pattern on the rule 67 comprises a pulse sequence of six pulses which begin with a broad start pulse and end with a broad stop pulse. Each section has an individual distance between the parallel strips, whereby the section concerned is indicated by the pulse distance between the second and the third negative-going pulse and also between the fourth and the fifth negative-going pulse in the obtained pulse series of six negative-going pulses. The fine calibration within a section is given by the pulse distance between the third and the fourth pulse.

Figure 6:
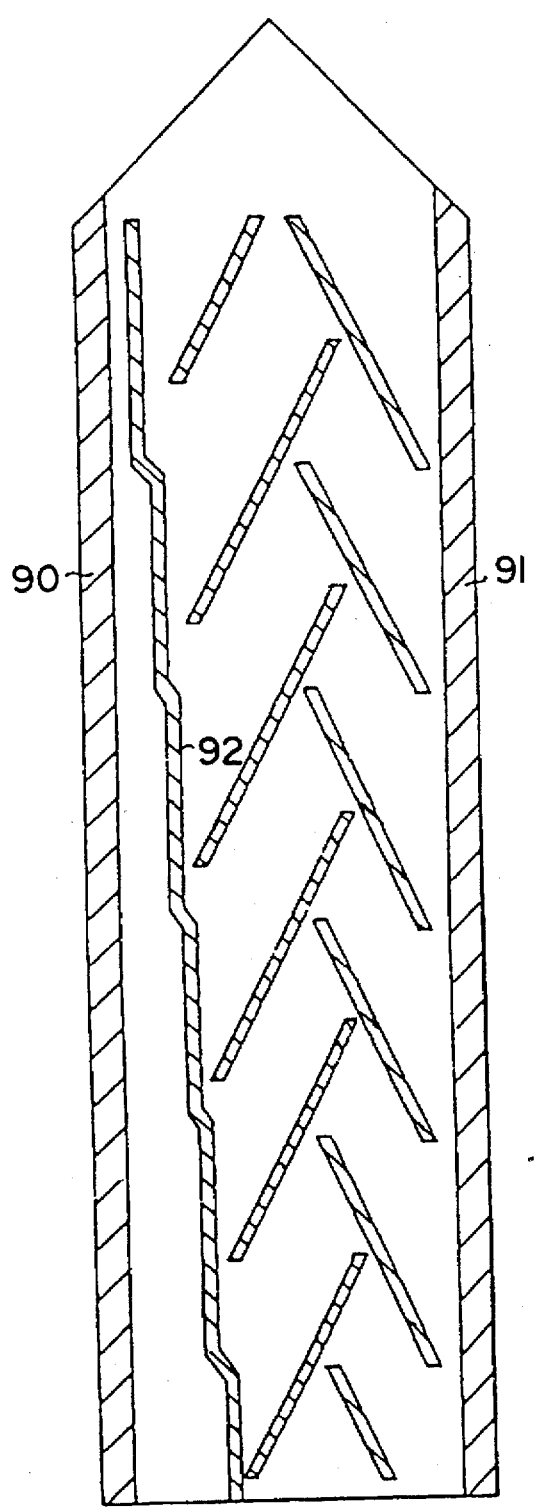
Figure 7:
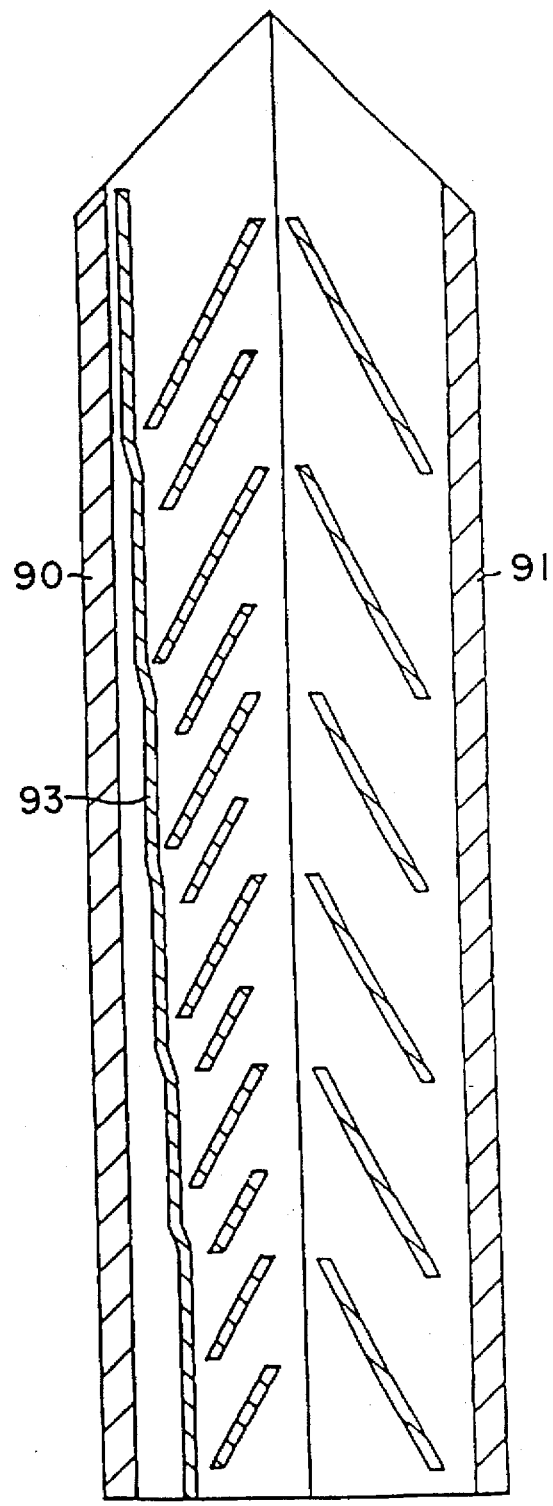

FIGS. 6 and 7 illustrate two variants of rules having a scale pattern which provides a rough estimation and a fine appreciation of the height position. In the case of these variants, however, the scale pattern is asymmetric around the rule center line. These embodiments also include a respective non-reflecting strip 90 and 91 provided on a respective edge of the rule to provide the time scale and an indication that the measuring beam has impinged on a scale pattern. Both embodiments are divided into sections along their respective lengths. Each non-reflecting strip 92 and 93 is placed close to the start strip 90 and is positioned so as to be parallel with the start strip within each section, but is deflected step-wise at the section boundaries so as to be spaced further from the start strip at the different sections. This provides an indication of the section over which the beam passes in a simple manner. Each section can then be divided into sub-sections and an indication of the sub-section within which the beam moves is obtained by making the number of negative-going pulses different for different sub-sections, for instance two or three pulses for different sub-sections.

Figure 8:
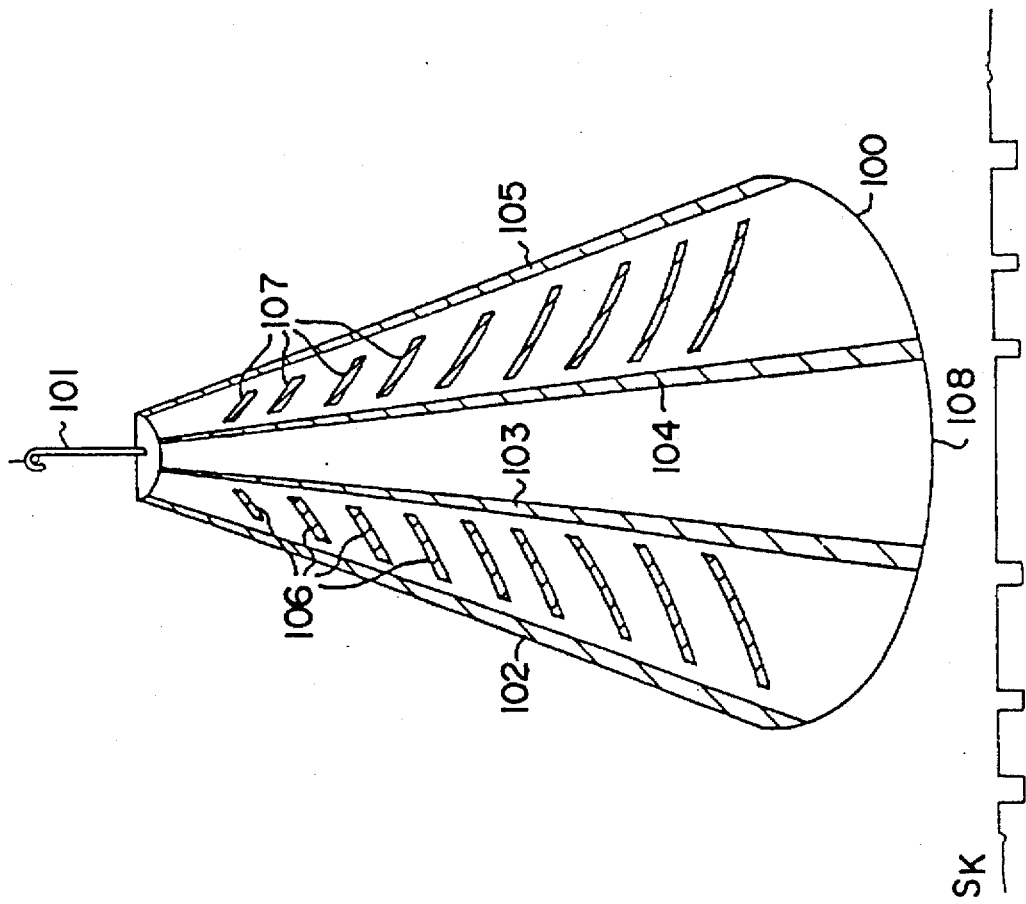

In the case of the illustrated and described embodiments, the scale patterns are mounted on a flat rule. However, it is also possible to apply a scale pattern to a conical body 100, as illustrated in FIG. 8. Naturally, although the body illustrated in FIG. 8 has the form of one half of a truncated cone, it is possible to use a complete truncated cone. This enables one type of pattern to be mounted on the curved side of the rule and another type of pattern to be mounted on its flat or straight side (the rear side in the Figure). The different sides of the body can be used with different types of measuring processes. For instance, one pattern may be particularly useful when measuring one particular car model while another pattern is particularly useful when measuring another car model. The geometrical shape of the rule will avoid the pattern-carrying sides being confused when hanging-up the rule. A hanging device 101 in the form of a hook, for instance, is conveniently mounted on the upper side of the half-cone, vertically above the center of gravity thereof, so that the straight side of the half-cone will hang vertically downwards.

Naturally, the rule can also hang obliquely at an angle in the case of a conical surface. In this case, each surface traversed by the measuring beam is round. It is essential in the case of this embodiment that the start and stop regions extend in a vertical section through the center of the cone. At least three straight lines on the mantle surface along the vertical section are required in order to ascertain rotation of the cone in relation to the measuring beam. The embodiment illustrated in FIG. 8 has four straight lines, of which the two center lines can also be used to obtain a rough height-estimation.

It is also possible not to use a full half-cone. The vertical cut can be made so that a horizontal section through the rule will have the form of the segment of a circle. This embodiment is preferred, since the rule will then take up less space.

rule may also be given the form of a half-conical mantle surface having a convex and a concave side.

The scale pattern shown in FIG. 8 is similar to the scale pattern shown in FIG. 2. In the case of the FIG. 8 embodiment, the non-reflective parts 102–105 of the pattern which extend in straight lines between the base and the upper part of the "rule" are each applied in a respective vertical plane through the cone. This also applies to the broader strips on the edges of the pattern. One advantage with this configuration is that the distance between the broad strips will also provide rough information of the height position and can be used as an additional check facility. Another advantage afforded by the arrangement shown in FIG. 8 is that measurements can be made on rules located in obstructed positions, at least with regard to less accurate measurements, when solely a part of the rule is obstructed, by utilizing the distances between one edge pattern-part 102 or 105 and the two central, elongated pattern-parts 103 or 104 for a rough estimation of the height position and for information concerning rotation of the rule. A fine indication of the height position is given by the oblique non-reflective pattern-parts 106 and 107 provided in different vertical sections on the non-obstructed part of the rule in relation to one of the pattern-parts 103 or 104. The oblique pattern-parts are identical on either side of a center line. These patternparts may have mutually the same angle of inclination from section to section, although this is not absolutely necessary. As will be understood, variants are conceivable which include more than two rough-estimation systems of the type shown in FIGS. 3 and 4.

It is also feasible to provide different degrees of reflectance on the reflective parts between the non-reflective strips 102, 103 and 104, 105 and the reflective part 108 between the strips 103 and 104, for instance so that the part 108 has a lower reflectance achieved by screen printing in rows over the reflective surface, for instance. This will result in two highly reflective side-bands on each side of the part 108 of low reflectance. The signal $s_k$ obtained when the beam path 47 moves over the scale pattern is, in this case, in the center of two negative pulses with a pulse interspace which does not reach right up to the level of a fully re-reflected beam. This embodiment enables those short pulses which belong together to be readily detected.

It will be understood that all of the patterns illustrated in FIGS. 2–7 can be adapted to a rule having the geometrical configuration illustrated in FIG. 8.

It will be observed that a pattern applied to the straight side (obstructed in FIG. 8) of the rule can also utilize the triangular shape of the rear side, so as to enable the start and stop strips to be utilized in obtaining a rough estimation and the vertical strips can be utilized to indicate rotation or twisting of the rule and to indicate whether or not the relevant time scale correlated with the speed of the scan can be placed inwardly of the start and stop strips.

Figure 9:
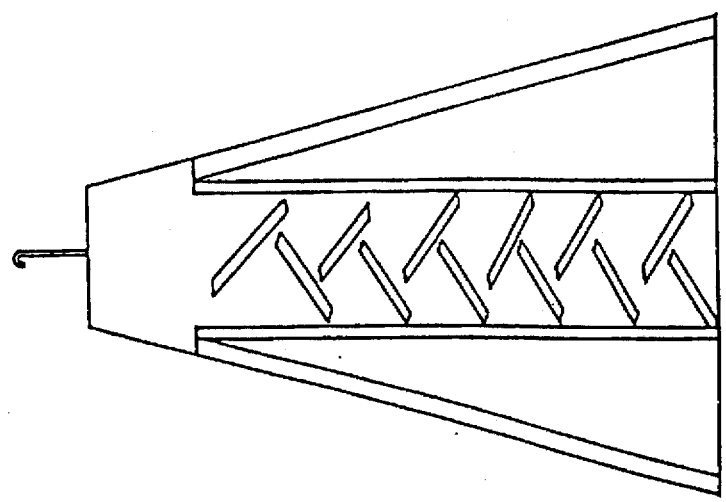

FIG. 9 illustrates a pattern of a kind adapted to the triangular shape of the straight rear side of the part-cone rule. Other patterns can be readily devised when applying the aforedescribed principles. For instance, the triangular reflective side-surfaces may also be provided with pattern parts.

The measuring height shall be seen in relation to the rule suspension point, i.e. in relation to the measuring point. The scale pattern is adapted to the length or distance from the measuring point and is fully determined in relation to this length or distance. Consequently, sheet-like stickers bearing scale patterns and stuck onto the rules must be clearly marked to show where the measuring point in question shall be placed in relation to the measuring sticker or sheet.

The position of a hit in the Z-direction is also measured with the aid of the scaled rules or like devices. The calculating unit 11 calculates by analyzing the mutual relationships between the pulses in the pulse train in the detector signal obtained with the occurrent scale pattern in accordance with the principles described above with regard to the different embodiments of the rules provided with a scale pattern.

When monitoring only a few measuring points in particular, it may be impractical to employ a triangle measuring process in order to obtain the distance of a rule from the measuring rail with the aid of angular adjustments to the outgoing light beam in a horizontal plane. Consequently, measurements taken on the rules concerned can be taken at different heights on the monitored rules. The outgoing light beam is then raised so as to impinge on a higher part of the rule scale pattern. Either the inclination of the carriage 1 on the rail 2 or the inclination of the pentagon mirror 17 on the carriage 1 is adjusted so that the beam path will extend obliquely to a horizontal plane. The height at which the measuring light beam impinges on or hits the rule is measured in the aforedescribed way. The distance of the rule from the rail 2 can then be determined by angling the beam path upwards and downwards at a predetermined angle, for instance 6° or to provide two angled beam paths simultaneously. Naturally, the beam path may be angled upwards and downwards at different angles.

The distance can then be calculated geometrically on the triangle that is obtained with its top angle on the rail 2 and with its base on the rule, the length of which is calculated with the distance between the two resultant height positions when angling the beam path upwards and downwards and with the signal configuration obtained when moving the carriage backwards and forwards along the rail 2. The calculating unit 11 calculates the three coordinates for the two positions obtained on each rule in the aforedescribed manner. In this regard, attention is paid, of course, to the obliqueness of the light beam in relation to the measuring rail in the geometric calculation.

Calculating Principles

The geometrical calculation principles are in themselves well known to the skilled person and need not be described in detail anywhere in the present document. The time points at which the light beam impinges on non-reflecting and reflecting material on the rules are fed into the calculating unit 11, as is also an indication of the current position of the carriage along the measuring rail with each hit or impingement. In the case of the FIG. 1 embodiment, this is achieved with the aid of the motor 9, although it will be understood that any type of position indicator suitable for this purpose may be used.

Many different types of position indicating devices are known to the art. Indicated hits which correspond to the same part of each rule, for instance the start strip of the embodiments illustrated in FIGS. 5–9, are used to calculate the position of the carriage 1 along the measuring rail 2 on the occasion of a hit.

It will be understood that many variations are conceivable within the scope of the invention defined in the following Claims. For instance, the start and stop strips may have a special stripe configuration with alternating non-reflective and reflective parts so as to provide a fully distinct signal picture which differs essentially from any signal picture that can be obtained from the part which includes measuring strips. An essential feature of the invention, however, is that all rules used when measuring an object will be fully similar to one another. This means that no individual coding is allowed or warranted.

I claim:

1. A scale pattern device which is placed in a close vicinity to a measuring point whose position in at least one dimension is to be determined, said scale pattern device comprising:

a longitudinal body across which a narrow measuring beam is moved in a plane to impinge and sweep across a width dimension thereof;

a position pattern which is provided on said body and impinged by the beam, the impingement of the beam on said position pattern producing different signal patterns in an indicating device indicative of different beam positions along a length dimension of the body so that the position of the measuring point relative to beam position on said body in the one dimension can be determined; and a calibration pattern which is also provided on said body also impinged by the beam, the impingement of the beam on said calibration pattern producing a time or length scale calibration of the signal pattern obtained by the indicating device as the beam is swept across the position pattern.

2. A scale pattern device as claimed in claim 1 wherein said calibration pattern (a) is one of a reflective or non-reflective strip, (b) extends longitudinally along an edge of said body, and (c) has a predetermined width which is larger than a width of any discrete portion of said position pattern.

3. A scale pattern device as claimed in claim 1 wherein said position pattern is comprised of:

a coarse pattern portion which is used to determine a rough position of the beam along the length of said body, and a fine pattern portion such that after a rough beam position along the coarse pattern portion is determined, a more precise beam position is obtained with the fine position pattern portion.

4. A scale pattern device as claimed in claim 1 wherein said coarse pattern portion is divided longitudinally into a plurality of coarse pattern sections, and wherein said fine pattern portion is divided into at least one fine pattern section associated longitudinally with each respective said coarse pattern section, whereby the position of the beam in one of said coarse pattern sections is first determined and then the position of the beam in the determined coarse pattern section is more precisely determined with the fine pattern portion associated therewith.

5. A scale pattern device as claimed in claim 4 wherein each said coarse pattern section includes a segment which longitudinally overlaps with an adjacent said coarse pattern section, and wherein each said fine pattern section includes a segment which longitudinally overlaps with an adjacent said fine pattern section.

6. A scale pattern device as claimed in claim 5 wherein the overlapping segments of said coarse pattern sections are located at different longitudinal positions relative to the overlapping segments of said fine pattern sections.

7. A scale pattern device as claimed in claim 1 wherein said body includes a conically rounded surface.

8. A scale pattern device as claimed in claim 1 wherein said body includes a reflective surface and said position pattern and said calibration pattern are non-reflective.

9. A scale pattern device as claimed in claim 1 wherein said body includes a non-reflective surface and said position pattern and said calibration pattern are reflective.

* * * * *